United States Patent [19]

Anderson

[11] 4,353,571
[45] Oct. 12, 1982

[54] WHEELIE SUPPORT

[76] Inventor: Ray C. Anderson, 7605 S. Quebec, Tulsa, Okla. 74136

[21] Appl. No.: 191,124

[22] Filed: Sep. 26, 1980

[51] Int. Cl.³ .......................... B62H 1/12; B62J 27/00
[52] U.S. Cl. ..................................... 280/295; 280/293
[58] Field of Search ............. 280/293, 295, 296, 301, 280/239; 180/210

[56] References Cited

U.S. PATENT DOCUMENTS

| | | | |
|---|---|---|---|
| 418,923 | 1/1890 | Mortson | 280/296 |
| 3,437,351 | 4/1969 | Newbern | 280/293 |
| 4,153,268 | 5/1979 | Wilson et al. | 280/296 |
| 4,154,452 | 5/1979 | Newman | 280/293 |

*Primary Examiner*—Joseph F. Peters, Jr.
*Assistant Examiner*—Donn McGiehan
*Attorney, Agent, or Firm*—Head, Johnson & Stevenson

[57] ABSTRACT

A device that allows support at the correct angles on a bicycle or motorcycle to enable the rider to perform a wheelie. Contact is on two points, the rear wheel and the wheelie support which offers stability.

3 Claims, 13 Drawing Figures

WHEELIE SUPPORT

BACKGROUND OF THE INVENTION

This invention relates generally to bicycles and motorcycles and more particularly to the function of performing a wheelie on such vehicles. Normally to achieve the correct angle in relationship to the center of balance for each rider requires a high amount of skill. This device allows the rider to simply power the vehicle up to the approximate angle and rest on the outboard wheelie support to achieve results. The safety factor is enhanced because the vehicle cannot roll out from under the rider.

SUMMARY OF THE INVENTION

It is an object of the present invention to provide a bicycle or motorcycle with an outboard support to enable the rider to perform a wheelie.

It is another object to provide a support using an additional wheel.

It is another object to provide a support using a sliding member.

It is another object to provide adjustment means for support to change angle.

It is another object to provide tabs on a fender to support a wheel.

It is another object to provide a safe method to perform a wheelie.

DESCRIPTION OF THE PREFERRED EMBODIMENT

Figure 1:
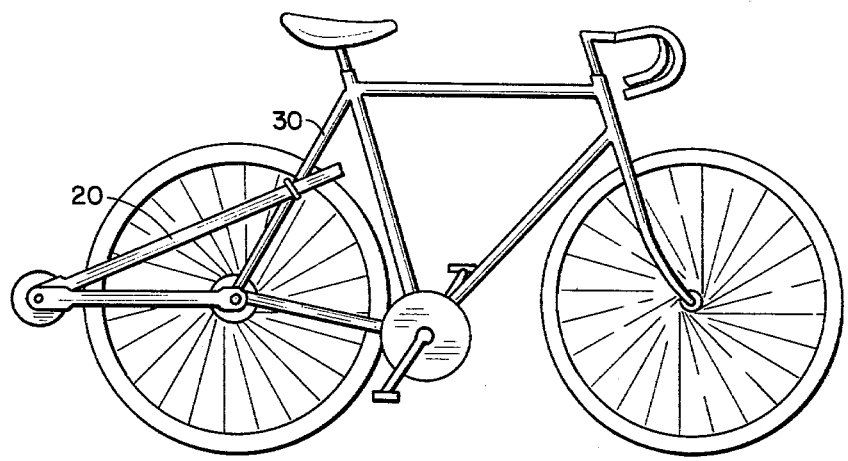
FIG. 1 is a schematic overall illustration of a wheelie support on a bicycle.
Figure 2:
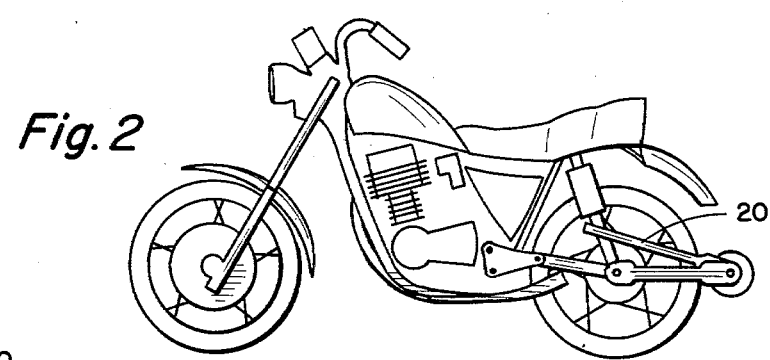
FIG. 2 is a schematic overall illustration of a wheelie support on a motorcycle.
Figure 3B:
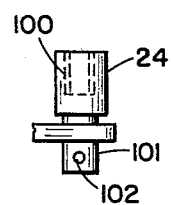
FIG. 3B is an enlarged view of the axle extension for connection between the axle and the wheelie support.
Figure 3A:
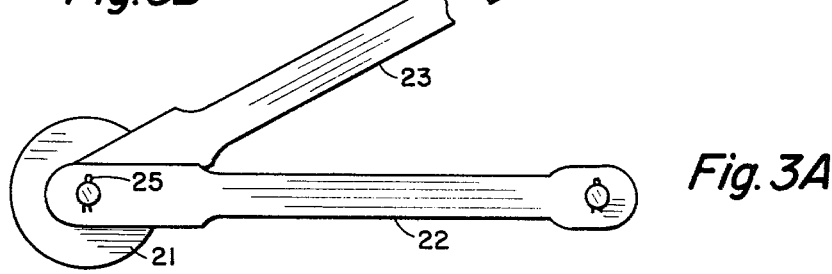
FIG. 3A is an expanded view of a wheelie support shown in FIG. 1 and FIG. 2.

One embodiment of the wheelie support is designated generally by the numeral 20 and is illustrated in schematic form in FIG. 1 and FIG. 2. The wheelie support 20 is shown mounted to the axle bolt and the frame support on both a bicycle and motorcycle. The support bar 22 is of tubular construction with flattened ends and drilled holes in flattened ends to allow for axle extension 24 and wheel axle. The angular support bar 23 has one flattened end with hole for wheel axle and holes 27 for U-bolt 28 and also for adjustment. Vehicle support bar 29 offers a clamping point for U-bolt 28.

Figure 4A:
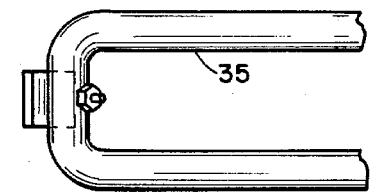
FIG. 4A is a plan view an alternate embodiment using a skid plate design.
Figure 4B:
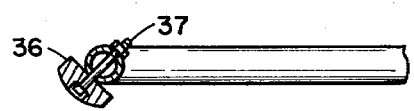
FIG. 4B is a cross-sectional side view of the skid plate embodiment of FIG. 4A.

An alternate arrangement using a skid plate 36 and a U-tube construction 35 with bolts 37 is shown in FIG. 4.

Figure 5:
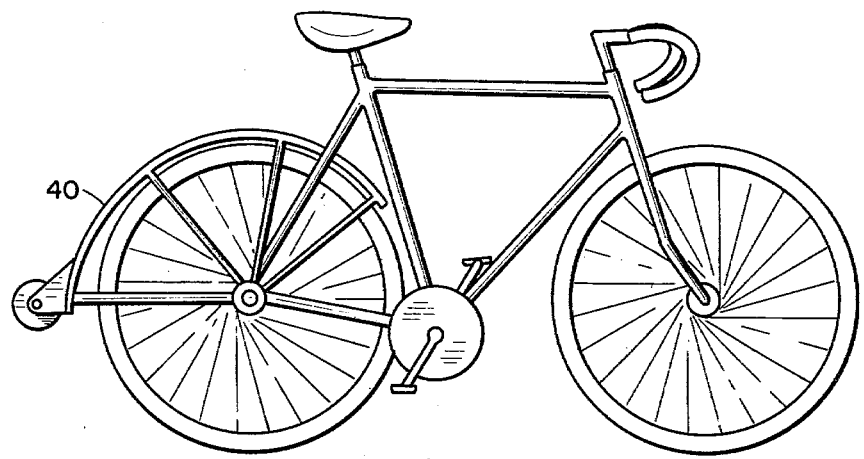
FIG. 5 is a schematic overall illustration of a wheelie support incorporated into a fender.
Figure 6A:
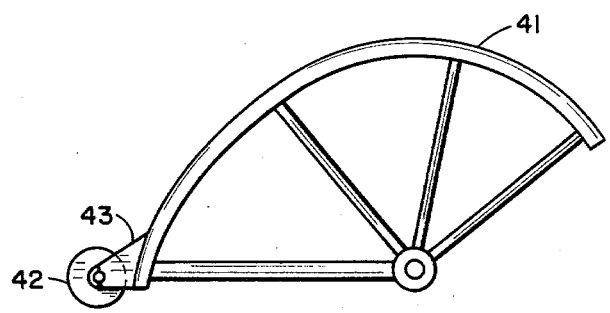
FIG. 6A is an expanded view of the wheelie support shown in FIG. 5.
Figure 6B:
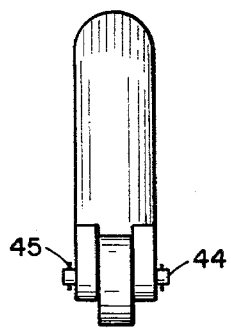
FIG. 6B is a rear end view of FIG. 6A of the wheelie support incorporated into a fender.

Another embodiment of the wheelie support is designated generally by the numeral 40 and is illustrated in schematic form in FIG. 5 and FIG. 6. A fender 41 is shown with tabs 43 and axle 44 and cotter pins 45.

Figure 7:
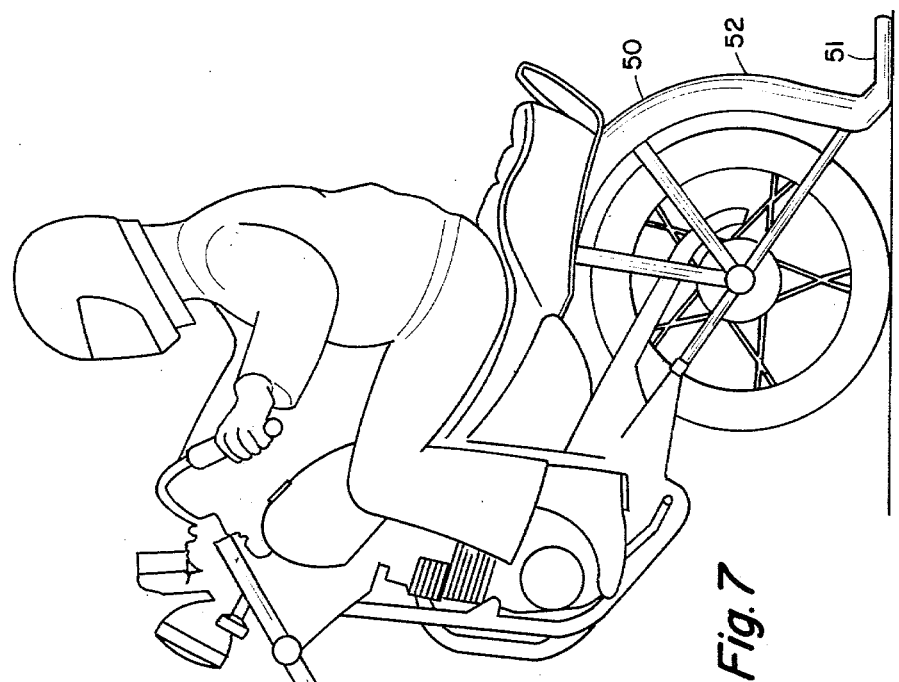
FIG. 7 is a schematic overall illustration of a wheelie support incorporated into a fender.
Figure 3D:
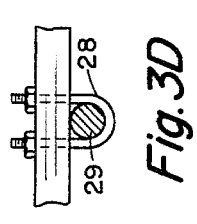
FIG. 3D is a detailed view of the U-bolt clamp of the wheelie support to the vehicle support bar.
Figure 3C:
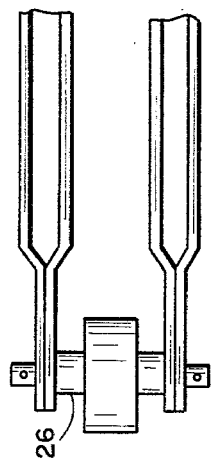
FIG. 3C is a plan view of the rear end of thw wheelie support shown in FIG. 3A.
Figure 8:
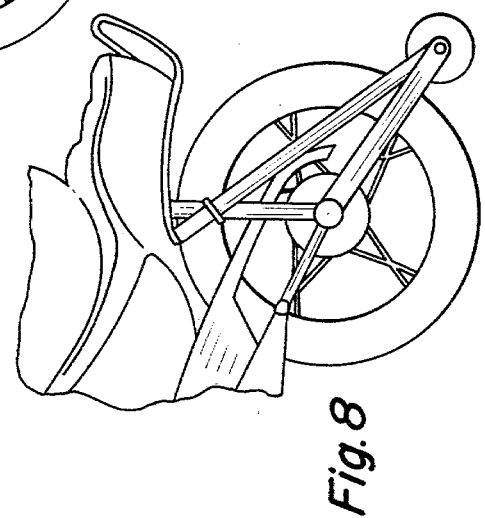
FIG. 8 is a partial schematic illustration of a wheelie support using tubular members to attach a small diameter wheel to the frame of a motorcycle.

Another embodiment of the wheelie support is designated generally by the numeral 50 and is illustrated in schematic form in FIG. 7. A skid plate 51 is shown incorporated into or onto the fender 52. FIG. 8 shows the wheelie support, FIG. 2, in contact with the driving surface.

In operation the vehicle, bicycle or motorcycle is powered up to the approximate angle for a wheelie and in doing so, contact is made with the wheelie support which allows the wheelie angle to be maintained. Not shown is a springloaded cushion to eliminate bounceback. To assemble the wheelie support in FIG. 1 and FIG. 2 first mount the axle extension 24 to the vehicle axle. Axle extension 24 has a tapped hole 100 which matches vehicle axle which is normally protruding and by threading axle extension 24 onto the vehicle axle, a stud 101 is provided for support tubing 22. Assemble axle 26 through support 23 and support 22 and cotter pins 25 together. U-bolt 28 mounts to vehicle support bar 30 and through adjustment holes 27. Also cotter pin 25 through hole 102. FIG. 4 shows a modified form using skid plate 36.

Referring now to FIG. 5 there is illustrated a modified form of the present invention. A fender 41 has tabs 43 and a wheel 42. Axle 44 and cotter pin 45 completes the assembly. Adjustment holes may be provided in fender for fender rotation.

FIG. 7 shows a modified form of the present invention using a skid plate 51 mounted to the fender 52. Adjustment holes may be provided in fender for fender rotation. FIG. 8 shows the wheelie support, FIG. 2, in contact with the driving surface. More than one wheel may be used.

It is to be understood that the embodiments shown and described are by way of example only and that many modifications can be made thereto without departing from the spirit of the invention. The invention is not to be construed as limited to the embodiments shown and described except insofar as the claims may be so limited.

I claim:

1. Apparatus for use with a two-wheeled conveyance having a frame, such as a motorcycle or bicycle, having a forward and a rearward wheel, providing means when the front wheel is raised off the support surface to add stability to the vehicle, comprising:

a fender covering the upper portion of the rear wheel of the conveyance;

means affixed to and extending rearwardly of the conveyance rear wheel fender which is normally above and out of contact with the support surface, and which engages the support surface when the conveyance front wheel is raised off the support surface a preselected amount.

2. Apparatus according to claim 1 wherein said means extending rearwardly of the conveyance rear wheel fender includes wheel means.

3. Apparatus according to claim 1 wherein said means extending rearwardly of the conveyance rear wheel fender includes slide means.

* * * * *